United States Patent [19]

Yoshimoto et al.

[11] Patent Number: 4,660,094

[45] Date of Patent: Apr. 21, 1987

[54] METHOD FOR FOCUS ADJUSTMENT OF A PICTURE SCANNING AND RECORDING SYSTEM

[75] Inventors: Takeshi Yoshimoto; Masanari Tsuda, both of Kyoto; Yoshikazu Masuda, Osaka; Masakatsu Yokoi, Kyoto, all of Japan

[73] Assignee: Dainippon Screen Seizo Kabushiki Kaisha, Kyoto, Japan

[21] Appl. No.: 582,071

[22] Filed: Feb. 21, 1984

[30] Foreign Application Priority Data

Mar. 8, 1983 [JP] Japan .................... 58-36744

[51] Int. Cl.$^4$ .................................. H04N 1/04
[52] U.S. Cl. .................................. 358/285; 358/227; 358/289; 358/293; 358/292; 355/55; 250/201; 250/578
[58] Field of Search .............. 358/285, 227, 199, 298, 358/205, 283, 214, 289, 292, 296, 293; 355/55, 56; 356/123, 125; 354/25; 250/578, 201, 210 DP, 201 AF; 369/45, 46

[56] References Cited

U.S. PATENT DOCUMENTS

| 3,997,715 | 12/1976 | Elliot | 369/46 |
| 4,079,247 | 3/1978 | Bricot | 250/201 DF |
| 4,152,586 | 5/1979 | Elliot et al. | 250/201 AF |
| 4,370,038 | 1/1983 | Kimura | 358/227 |
| 4,383,274 | 5/1983 | Imuiya | 358/227 |
| 4,422,097 | 12/1983 | Imuiya | 358/227 |
| 4,445,126 | 4/1984 | Tsukada | 358/285 |

Primary Examiner—Edward L. Coles, Sr.
Attorney, Agent, or Firm—Hayes, Davis & Soloway

[57] ABSTRACT

A method for obtaining a desired picture with high quality by scanning a rotating recording drum by a scanning light beam, which produces images on the drum through a projection lens, receiving the said images being reflected from the drum through the projection lens on an image sensor, detecting variations of diameter of the drum per each rotation from variations of intensity of light of the images, whereby position of the projection lens being movable along the normal direction of the drum is automatically adjusted against machining errors of the drum diameter and variations of the said diameter caused by changes of its surrounding or any other reasons, temperature, so that variations of imaging points of the scanning light beam can always be within a range of depth of a focus of the projection lens.

2 Claims, 8 Drawing Figures

METHOD FOR FOCUS ADJUSTMENT OF A PICTURE SCANNING AND RECORDING SYSTEM

BACKGROUND OF THE INVENTION

1. Field of the Invention

This invention relates to a method for focusing during a picture scanning and recording, and more particularly to a method for automatically adjusting focus of images of a recording light beam against changes of distance between a recording drum and an exposure light source.

2. Description of the Prior Art

In recording, the recording drum which is applied with a medium to be recorded such as a film around its outer surface is rotated, and images are produced by a scanning light beam which is projected on the said medium through a projection lens provided on a recording head, and then, they are scanned for recording. In this case, when a large film, for example, 841×1189 mm or 1030×1456 mm, is required, the recording drum also should have a large diameter in accordance with the size of the medium or the film.

In such a drum as having a large diameter as well as a large width, it is more difficult in manufacturing the drum to keep machining errors of the drum diameter within a range of depth of a focus of the projection lens. Furthermore, changes of the diameter can be caused by changes of conditions in use and/or by changes of its surrounding temperature, which may result in troubles in recording operation.

SUMMARY OF THE INVENTION

1. Objects of the Invention

The object of this invention is to provide a method for obtaining a desired picture with high quality by that the position of the projection lens is automatically adjusted against machining errors of a recording drum diameter and changes of the said diameter caused by, for example, changes of its surrounding temperature, so that variations of imaging points of the scanning light beam can always be within a range of depth of a focus of the projection lens.

2. Features of the Invention

To achieve the above said object, according to the invention, the rotating recording drum is scanned by a scanning light beam which produces images on the drum through the projection lens, the said images are reflected also through the projection lens to indicate changes of the drum diameter per each rotation, and the projection lens is movable along the normal direction of the drum, so that the position of the projection lens is continuously adjusted in accordance with the changes of the diameter. It is not necessary to adjust per each one or several picture elements, but per single rotation of the drum.

This invention will be further described hereinafter with reference to the accompanying drawings.

DETAILED DESCRIPTION OF THE INVENTION AND THE PREFERRED EMBODIMENTS

Figure 1:
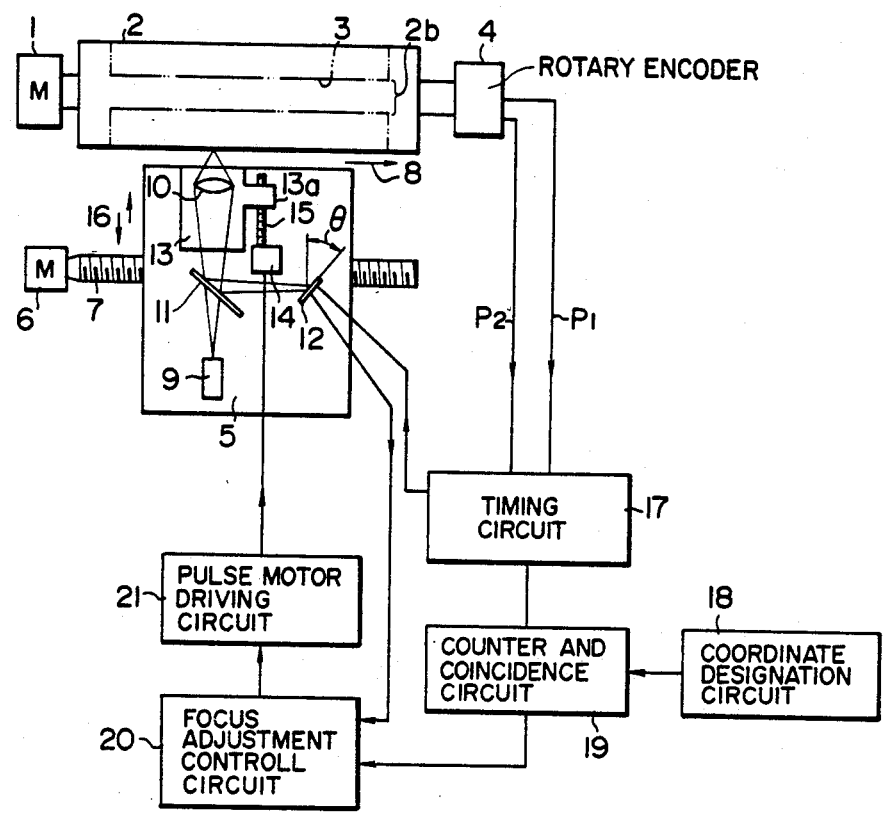
FIG. 1 is a schematic diagram of a picture scanning and recording system in accordance with this invention to show its operation.

Refering to the drawings, FIG. 1 shows one preferred embodiment of a picture scanning and recording system being adapted for the instant invention.

In FIG. 1, a recording drum 2 which is applied with a film 3 and a rotary encoder 4 are positioned coaxially, and are connected with each other to rotate simultaneously by a driving motor 1 which is also located coaxial to the recording drum.

A carrier 5 is movable in a direction shown by an arrow 8 along the axis of the recording drum 2 in parallel by means of a screw bar 7 which is rotated by a sub-scanning motor 6. A light source 9 is provided on the movable carrier 5 to project light beams on the film 3 through a projection lens 10, which is disposed between the light source and the film to diaphragm the light beams. The reflecting light beams from the film 3 are again passed through the projection lens 10, and are reflected by a half mirror 11 towards a image sensor 12.

A pulse motor 14 rotates a feed screw 15 to move a support 13 in a normal direction of the recording drum 2 (as indicated by arrows 16 in FIG. 1) through an arm 13a provided on the support 13, and also to move the projection lens 10 which is firmly fixed to the support 13, so that the light beams from the light source 9 can be focussed correctly on the film 3. The pulse motor 14 is driven by and in relation to the interactions of a timing circuit 17, a coordinate disignation circuit 18, a counter and coincidence circuit 19, a focus adjustment control circuit 20 and a pulse motor driving circuit 21, which is further described in detail hereinafter.

Figure 2:
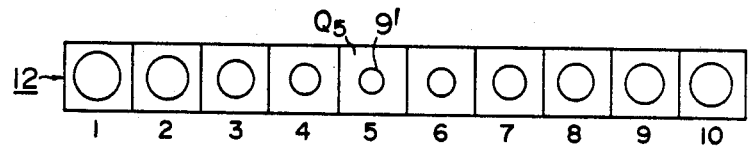
FIG. 2 is the image produced on the image sensor by the light beam.

FIG. 2 illustrates images 9' being projected on the image sensor 12 from the light source 9.

In case the light beams from the light source 9 are in focus on the image sensor 12, as typically illustrated in the region Q5, the image sensor 12 may be turned oblique about the region Q5 to a certain angle $\theta$ as shown in FIG. 1 while being held at the conjugated position with the light source 9, and the result is that the images in other regions except the region Q5 will become out of focus and become larger gradually as it remotes from the region Q5 as shown in FIG. 2.

Figure 3:
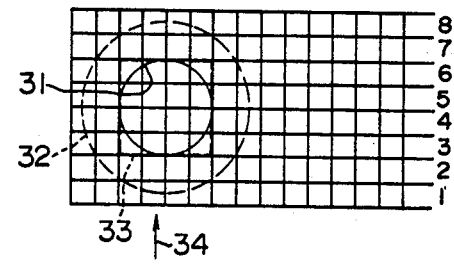
FIG. 3 is an enlarged partial view of the image shown in the above FIG. 2.

FIG. 3 shows a partial view of the image sensor 12 which comprises a plurality of elements such as MOST, CCD or BBD being arranged laterally and in lengthwise to form an oblong alley. When a light beam from the light source is correctly focussed by the adjustment of the projection lens, an image of the light source 9 created on the image sensor has strong intensity of light and a small area as shown in a solid line by the numerical reference 31, and when being out of focus, the image has a larger area with lesser intensity of light as indicated in a dotted line by the numerical reference 32.

Figure 4A:
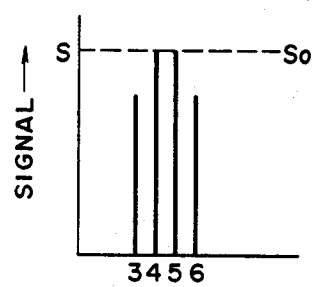
FIG. 4a and 4b are histograms showing the intensity of output signals from the image sensor.
Figure 4B:
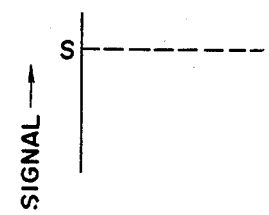

In FIGS. 4a and 4b, the intensity of lights is illustrated in the form of a histogram for each case of the above images taken in a direction of an arrow 34 as shown in FIG. 3. This invention is to designate by coordinates the area indicated by the dotted line 32 in FIG. 3, so as to find a correct position for focusing by detecting the intensity of light of the said coordinate designated area.

Figure 5:
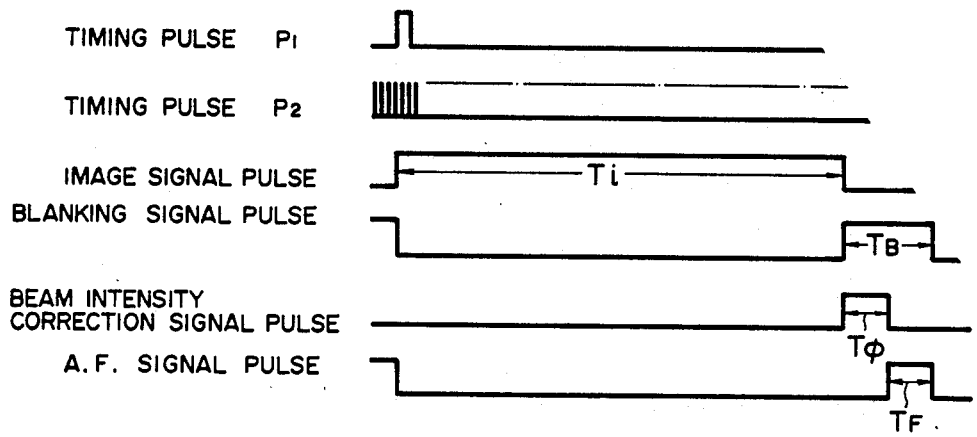
FIG. 5 is a timing chart of each timing pulse for a single rotation of the recording drum.

In FIG. 5, a timing pulse P1 and another timing pulse P2 are illustrated, the former having only one pulse and the latter having n pulses, and both of which are generated from the rotary encoder 4 through the timing circuit 17 for a single rotation of the recording drum 2.

Image signal period Ti indicates a time period during which the film 3 is applied on the recording drum, or, the film 3 applied on the recording drum 2 is scanned through the projection lens 10 by a scanning light beam. The various functions of the invention take place during blanking period $T_B$ in which the portion 2b of the recording drum 2 is scanned, where the film 3 is not applied thereon. A focus adjustment period $T_F$ is included within the blanking period $T_B$ for partial operations of the invention.

Figure 6:
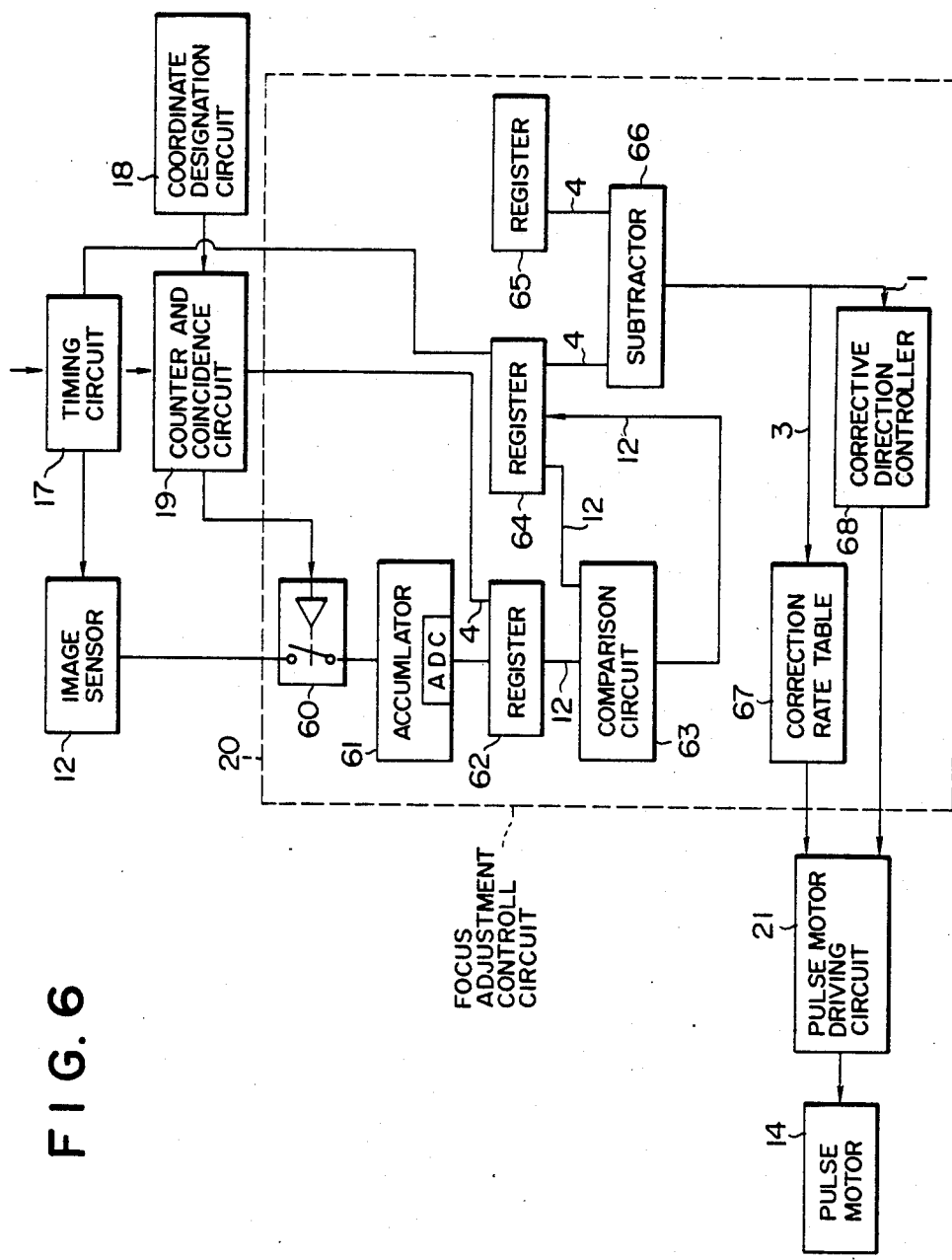
FIG. 6 is a block diagram of the control circuit adapted for the method for focusing in accordance with the invention.

FIG. 6 illustrates the components composing the focus adjustment circuit 20 in the FIG. 1.

Figure 7:
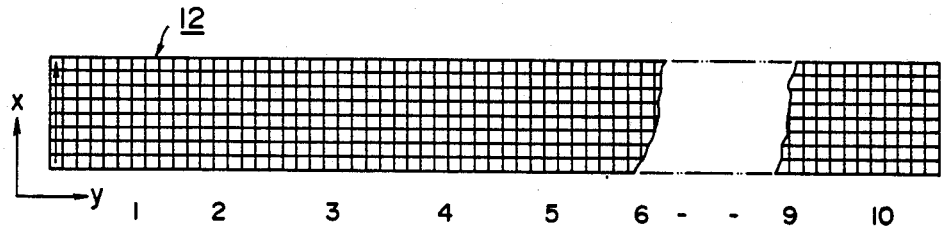
FIG. 7 is a front view of the image sensor.

As it is mentioned before, the image sensor 12 is composed of a plurality of elements arranged as shown in FIG. 7, and can be divided into regions which correspond respectively and in order to each light beam of the light source 9, for example ten regions as illustrated in FIG. 2. Each of the said regions includes a central region, as indicated by reference 33 in FIG. 3, in which the projection lens 10 is moved along the normal direction of the recording drum 2, so that each output light beam is adjusted to be in focus on the central region. Coordinates of the central regions within each divided region are preliminary set up corresponding to each output light beam at the central region coordinate designation circuit 18.

In accordance with signals from the timing circuit 17, a first line of the image sensor 12 is scanned in the direction "x" in FIG. 7, and upon its completion, then, a second line which is next to the first line in the direction "y" is scanned in the direction "x". All surfaces of the image sensor 12 are scanned one line by one line in the said manner, and the results are output as electrical signals for each divided region from the image sensor 12 to the focus adjustment circuit 20. With on-off operation of an analog switch 60 by the counter and coincidence circuit 19, a portion of output signals from the image sensor 12 for the central regions designated by the coordinate designation circuit 18 are introduced into an accumulator 61 and accumulated therewith. Then, the accumulated values are registered at a register 62 after A/D conversion into, for example, eight bit information as well as four bit information which indicates location number for the light beam region.

Thus, the four bit information for the location number of each region and the eight bit information for light intensity of each beam region are registered one after another for all those regions of the whole image sensor at the register 62.

Then, the twelve bit information registered at the register 62 are transmitted to a comparison circuit 63. At the comparison circuit 63, the eight bit data of a register 64 and the eight bit data of the register 62 for light intensity are compared, and the larger eight bit data of the above two are newly stored at the register 64 together with the four bit data of location number of the corresponding output beam region.

Thus, the light intensity of output beams for each region are compared one by one, so that the location number (four bit data) of an output light beam region with the strongest light intensity data is registered at the register 64. As it is known well, the timing circuit 17 clears the information stored at the register 64 by the use of an initial clear timing pulse.

It is not necessary to move the projection lens 10 when the final four bit data for a beam region registered at the register 64 is identical with the four bit data for an ideal address stored at the register 65, in which, for example, focus is adjusted correctly at the region Q5.

However, the projection lens 10 must be moved to adjust focus when the final four bit data registered at the register 64 is not identical with the ideal address four bit data stored at the register 65. The adjustment can be accomplished by either one of the two methods which are described hereinafter in detail.

A subtractor 66 subtracts four bit data between the register 64 and the register 65, and, in accordance with the result of the calculation, it outputs signals of one bit data for directional correction and that of three bit data for correction rate.

The one bit data is led into the input of a corrective direction controller 68 so that the direction in which the projection lens moves is controlled. The three bit data is led into the input of a correction rate table 67 where shifting rate of the projection lens is determined, whereby the rotational direction and rate of the pulse motor 14 can be controlled through the pulse motor driving circuit 21. The pulse motor 14 rotates the feed screw 15 to move the support 13 as well as the projection lens 10 attached thereon in the normal direction of the recording drum 2, so that focus of the projection lens 10 is adjusted on the film 3.

The light source 9 is usually composed of a plurality of output light beams particularly for the purpose of halftone processing.

However, plural beams are not always required and, for example, forming a picture may be sufficiently performed by utilizing only a single output light beam of the light source instead of plural beams. Therefore, in another embodiment of the method of the invention, it is only during a focus adjustment period $T_F$ that plural beams are used, though the light source is provided with plural light beams.

Furthermore, in this case, while the image sensor 12 is fixed at the angle $\theta$ equal to zero, the light source 9 can be prepared such that each output beam is arranged at stepped positions to have a different emission distance from the light source 9 to the image sensor 12, whereby errors in focusing can be detected.

The image sensor 12 may also comprise a plurality of divided regions which are central regions.

Any light source is acceptable so far as it can be aligned in a single row, regardless of its form or type of its luminous material.

In FIG. 1, the light source 9, the half mirror 11 and the image sensor 12 can be also firmly mounted on the support 13 of larger size instead of on the movable carrier 5.

In the above preferred embodiments of the invention, the blanking period $T_B$ is set for the portion 2b of the recording drum 2, and it also can be set at one of both sides of the film 3 on the drum along its length.

In accordance with the instant invention, the focus adjustment can be effectively performed regardless of changes of the distance between the projection lens 10 and the recording drum 2 caused by machining errors of the drum and/or changes of circumferencial conditions such as temperature in use.

The machining errors of the drum slightly occur in the longitudinal direction but not to a single circle in rotational direction. Therefore, the method of the invention is not so advantageous in use of a drum which has short length. The invention is particularly effective and advantageous when the recording drum has length. The method of the invention can reduce production cost of the recording drum, which increases as the drum has larger diameter and length with increasing difficulty of machining, from increasing, and also contributes to putting drums with larger diameter and length into practical use.

What is claimed is:

1. A method for focus adjustment of a picture scanning and recording system during picture scanning and recording, the method characterized by comprising the steps of:

arranging in a row a plurality of luminous light beams generated from a light source;

projecting said light beams onto a photosensitive material through a lens;

receiving reflected light beams from said photosensitive material, on an image sensor;

said image sensor including a plurality of photoelectric conversion elements, a predetermined region formed by a plurality of said photoelectric conversion elements on a part of said image sensor is placed at an optically equivalent position to said light source with respect to said lens, and optical-axial distances between said photosensitive material and each region corresponding to each of said light beams on said image sensor are different;

detecting variations in focus of the light beam on a surface of said photosensitive material from variations in intensity of said light beams received on said image sensor;

whereby automatic adjustment of focus at a desired point is obtained.

2. A method for focus adjustment of a picture scanning and recording system during picture scanning and recording, the method characterized by comprising the steps of:

arranging in a row a plurality of luminous light beams generated from a light source, said light beams have different distances on an optical-axis between each light beam and a photosensitive material;

projecting said light beams on to said photosensitive material through a lens;

receiving the light beams, which are reflected from said photosensitive material, on an image sensor, said image sensor including a plurality of photoelectric conversion elements, said image sensor is placed at an optically equivalent position to a predetermined light beam source with respect to said lens;

detecting variations in focus of the light beams on a surface of said photosensitive material from variations in intensity of said light beams received on said image sensor;

whereby automatic adjustment of focus at a desired point is obtained.

* * * * *